United States Patent
Le Biannic

(10) Patent No.: US 10,083,223 B2
(45) Date of Patent: Sep. 25, 2018

(54) IDENTIFICATION OF COMMON ATTRIBUTES IN MULTIPLE DATASETS

(71) Applicant: SAP SE, Walldorf (DE)

(72) Inventor: Yann Le Biannic, Suresnes (FR)

(73) Assignee: SAP SE, Walldorf (DE)

(*) Notice: Subject to any disclaimer, the term of this patent is extended or adjusted under 35 U.S.C. 154(b) by 232 days.

(21) Appl. No.: 15/189,220

(22) Filed: Jun. 22, 2016

(65) Prior Publication Data
US 2017/0371949 A1    Dec. 28, 2017

(51) Int. Cl.
*G06F 17/30*    (2006.01)

(52) U.S. Cl.
CPC .. *G06F 17/30598* (2013.01); *G06F 17/30312* (2013.01); *G06F 17/30315* (2013.01); *G06F 17/30477* (2013.01)

(58) Field of Classification Search
CPC .............. G06F 17/30; G06F 17/30598; G06F 17/30315
USPC ................................................ 707/600–899
See application file for complete search history.

(56) References Cited

U.S. PATENT DOCUMENTS 7,567,976 B1 * 7/2009 Betz .................. G06F 17/30498

\* cited by examiner

*Primary Examiner* — Isaac M Woo
(74) *Attorney, Agent, or Firm* — Buckley, Maschoff & Talwalkar LLC

(57) ABSTRACT

A system comprises reception of a dataset comprising at least one dataset attribute and one or more instances of each dataset attribute, determination of a similarity value between instances of each pair of one of the at least one dataset attribute and one of a plurality of stored attributes, determination of an intersection between instances of each pair of one of the at least one dataset attribute and one of the stored attributes having a similarity greater than a threshold, and generation of metadata associating a dataset attribute with a semantic entity with which a stored attribute having a similarity to the dataset attribute greater than the threshold is associated.

17 Claims, 9 Drawing Sheets

US 10,083,223 B2

IDENTIFICATION OF COMMON ATTRIBUTES IN MULTIPLE DATASETS

BACKGROUND

Enterprise software systems receive, generate, and store data related to many aspects of a business enterprise. This data may relate to sales, customer relationships, marketing, supplier relationships, inventory, human resources, and/or finances. Users operate reporting tools to access such data and display the data in useful formats, such as graphic visualizations.

Reporting tools may interact with a semantic layer defining a set of business-related abstract entities, referred to herein as business classes. Each business class associates one or more physical entities (e.g., a physical database table, associated columns of one or more database tables, etc.) of one or more data sources with user-friendly names. Business classes may be classified as attributes (or dimensions), along which one may want to perform an analysis or report (e.g., Year, Country, Product), or measures (e.g., Sales, Profit), whose values can be determined for a given combination of attribute values.

The instances of a given business class may appear in one or many stored datasets. For example, a "Customer" class may be associated with an "Issues" table column of a first dataset (received, e.g., from a first data source) and with a "Maintenance Contracts" table column of a second dataset (received, e.g., from a second data source). Upon uploading new datasets, it would be beneficial to efficiently associate existing business classes, which are associated with attributes of previously-uploaded datasets, with corresponding attributes of the new datasets.

DETAILED DESCRIPTION

The following description is provided to enable any person in the art to make and use the described embodiments. Various modifications, however, will remain readily apparent to those in the art.

Figure 1:
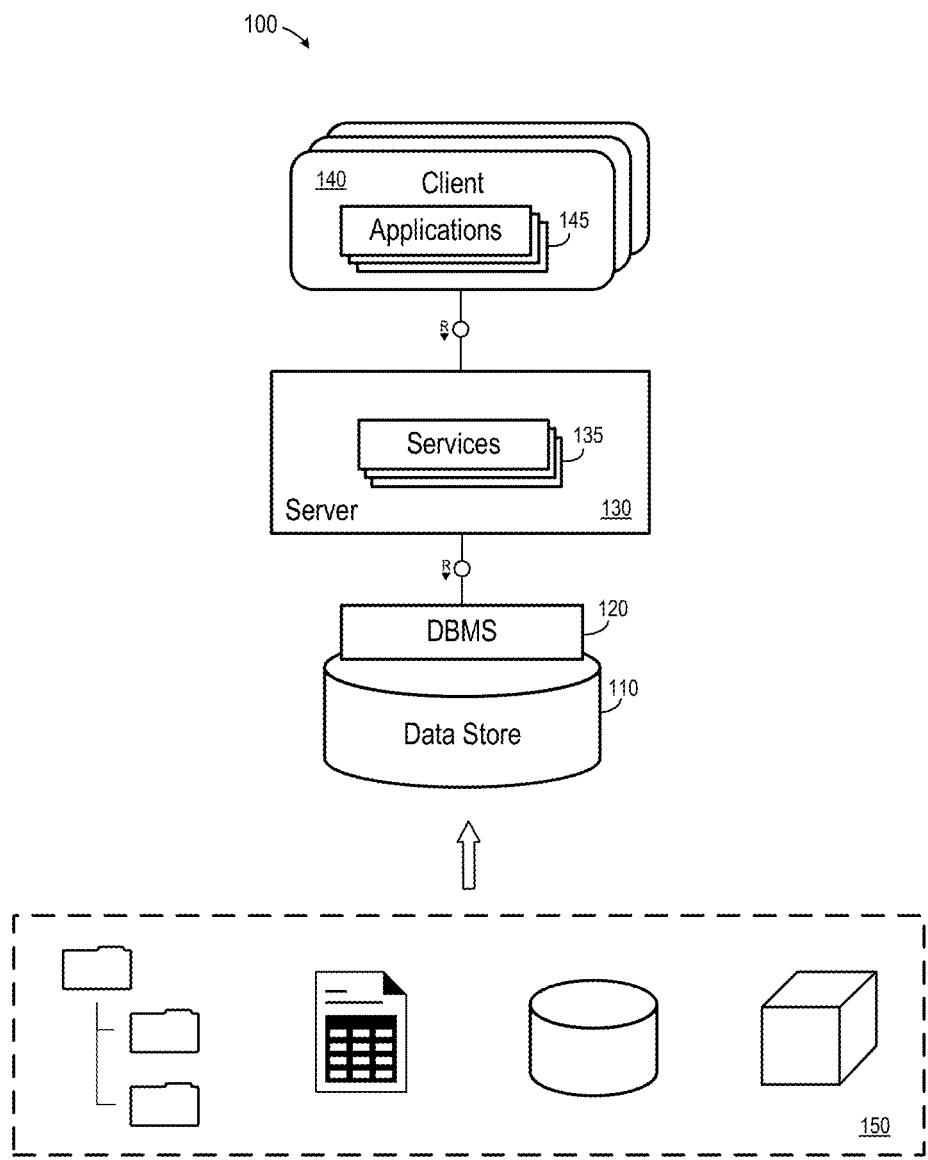
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140 and applications 145. Generally, services 135 executing within server 130 receive requests from applications 145 executing on clients 140 and provides results to applications 145 based on data stored within data store 110.

System 100 includes metadata defining business classes. The metadata be stored in data store 110 and/or a separate repository (not shown). The metadata may specify business class names (e.g., Country, Product, Customer, Profit, Sales), mappings of the business classes to respective attributes (e.g., table columns) of data store 110, and any other suitable metadata.

Data sources 150 may comprise any sources of datasets which are or become known, including but not limited to database views, spreadsheets, relational databases and/or OnLine Analytical Processing cubes. According to some embodiments, new datasets from data sources 150 are occasionally stored within data store 110. Each type of data source 150 may require a particular Extract, Transform and Load process in order to store its data within data store 110. As will be described in detail below, some embodiments provide association of attributes of these newly-loaded datasets with the aforementioned business classes, based on the attributes (e.g., table columns) and their respective instances (e.g., column values) which are already stored in data store 110 and the existing associations (e.g., mappings) between these already-stored attributes and the business classes.

Server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Server 130 may provide application services (e.g., via functional libraries) using which services 135 may manage and query the data of data store 110. The application services can be used to expose the database data model, with its tables, views and database procedures, to clients. In addition to exposing the data model, server 130 may host system services such as a search service.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

Figure 2:
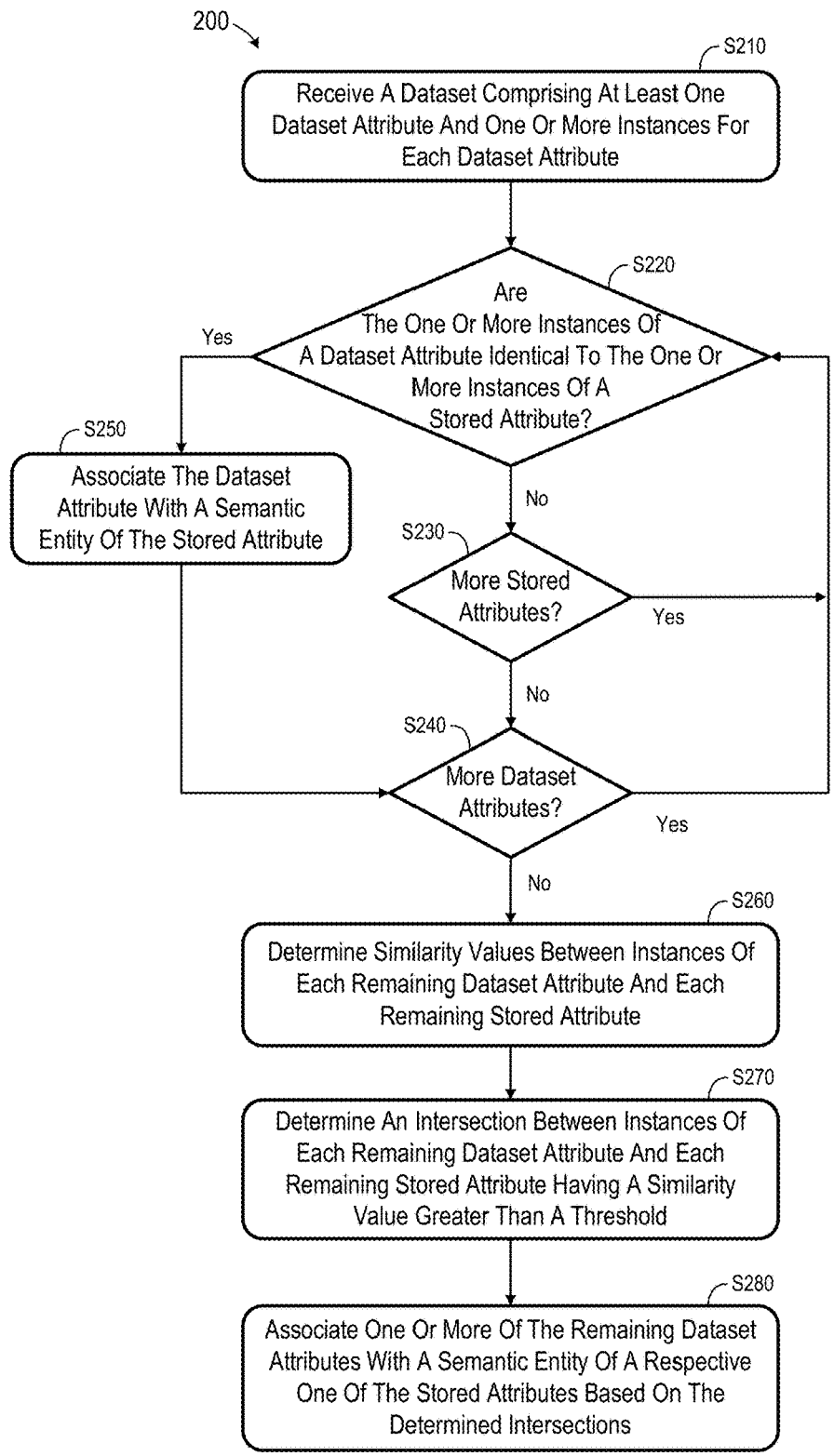
FIG. 2 comprises a flow diagram of a process according to some embodiments.

FIG. 2 comprises a flow diagram of process 200 according to some embodiments. In some embodiments, various hardware elements of server 130 and/or DBMS 120 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a dataset is received at S210. The dataset may be received from any structured data source, including but not limited to those mentioned herein. According to some embodiments, it will be assumed that the dataset is received by data store 110.

The dataset includes at least one attribute (which will be referred to as a dataset attribute for purposes of the present example). The dataset includes one or more attribute instances for each of the at least one dataset attributes. For example, the dataset may comprise a relational database table in which the columns are the attributes and the columns values are the attribute instances.

Next, at S220, it is determined whether the one or more attribute instances of a dataset attribute are identical to the one or more instances of a previously-stored attribute. In this regard, and for example, data store 110 stores many attributes and associated attribute instances (e.g., in the form of relational database tables) prior to S210. S220 may comprise determining whether a domain of one of the dataset attributes (i.e., the unique instances of the attribute in the dataset) is identical to the domain of one of the previously-stored attributes.

The determination at S220 may proceed by comparing the individual values of the domain of the dataset attribute to the individual values of the domain of the previously-stored attributes. Such a comparison is likely to be unsuitably resource-consuming. According to some embodiments, the determination is performed using a hash function. For example, a SHA-256 cryptographic hash function may be applied to the domain of the dataset attribute to determine a hash value. This hash value may be compared against a hash value which has been previously-determined for a domain of a previously-stored attribute. Matching hash values indicate identical domains.

In order to compare a new attribute A to all N previously-known attributes, the domain of A (i.e., its set of D unique values) is determined. Next, we iterate on all D values to compute a SHA-256 key: this step is roughly linear on D. At this stage, the new attribute A is represented as 256 bits, which can be encoded as a 44-character base 64 string or as a binary number.

The SHA-256 key is then compared to all other N known keys. This comparison may be accomplished in $o(1)$ if all N keys are indexed in a hash table, $o(N)$ using brute force, or $o(\log(N))$ if the N known keys are sorted. Therefore, the complexity of comparing a new attribute to all N previously-known attributes is: $o(D)+o(f(N))$, where $f(N)=1$, N or $\log(N)$.

Flow proceeds to S230 if it is determined at S220 that the domains are not identical. At S230 it is determined whether there are more stored attributes against which the dataset attribute may be compared. If so, flow returns to execute S220 with respect to a next previously-stored attribute (and the same dataset attribute). Flow therefore cycles between S220 and S230 to compare the domain of a dataset attribute against the domains of all previously-stored attributes, until an identical domain is located.

Once it is determined at S220 that one or more attribute instances of a dataset attribute are identical to the one or more attribute instances of a previously-stored attribute, flow proceeds to S250. At S250, the dataset attribute is associated with a semantic entity with which the stored attribute is associated. For example, if metadata of a semantic layer as described above specifies that the stored attribute is associated with a Customer class, then the metadata is updated to specify that the dataset attribute is also associated with the Customer class. Flow then continues to S240 to determine if additional dataset attributes of the received dataset remain to be compared. If so, flow returns to S220 and continues as described above.

Flow also proceeds to S240 if no previously-stored domain is determined to be identical to the domain of the current dataset attribute at S230. Flow therefore proceeds through S220, S230, S240 and S250 as described above until each dataset attribute of the received dataset has been compared against the stored attributes. According to some embodiments, S220 through S250 may be performed in batch mode, where every dataset attribute is compared against every stored attribute in parallel. In this regard, a hash value associated with each stored attribute may be maintained and used to compare against hash values of received dataset attribute domains.

Flow proceeds to S260 upon a negative determination at S240. At this point, zero or more of the received dataset attributes have been associated with a semantic entity of a semantic layer. The remaining dataset attributes of the received dataset (i.e., which have not been associated with a semantic entity of the semantic layer) will be referred to below as the "remaining" dataset attributes.

At S260, a similarity value is determined between each remaining dataset attribute and each stored attribute. Many formulae (e.g., the Jaccard Index) exist for the computation of a similarity value between two domains. According to some embodiments, S260 comprises calculation of $|h_k(A) \cap h_k(B)|/k$ for each pair of remaining dataset attribute domains A and stored attributes B, where $h_k(X)$ is the set of bottom k instances of X ordered by their hash key.

To determine $h_k(X)$, a temporary table T is created including two columns. The first column contains the source X values, and the second column contains the result of a hash function applied on the first column. Table T is sorted by ascending values of the second column. The first k tuples from T are kept and projected to keep only the first column of the first k tuples. As a result, a subset of the set X is created which contains only k elements. These elements are associated with the lowest hash values of all the hash values computed from X.

$h_k(X)$ may be referred to as the "hash signature" of the set X. Accordingly, $h_k(A) \cap h_k(B)$ is the intersection of two hash signatures, and $|h_k(A) \cap h_k(B)|/k$ is the cardinality of this intersection.

According to some embodiments, determination of similarity values at S260 using $|h_k(A) \cap h_k(B)|/k$ may be performed in at worst $o(D \cdot \log(D)) + o(N \cdot k \cdot \log(k))$ time, where k is a constant (e.g., k~100), and at best $o(D \cdot \log(D)) + o(N \cdot k)$ time.

At S270, an intersection is determined between each pair of dataset attribute domains A and stored attributes B which are associated with a similarity greater than a threshold (e.g., 80%). S260 therefore provides an efficient technique to prune the candidate pairs of domains such that a reduced number of intersections may be determined at S270. In some embodiments, S260 and S270 may be executed using an SQL statement such as the example below.

```
SELECT
    "ID2",
    "N2",
    "N12"
FROM ( SELECT
    "D"."CANDIDATE" AS "ID2",
    "D"."N2" AS "N2",
    COUNT(*) AS "N12"
    FROM "TABLE"."GRAPH_INDICES" "A"
    INNER JOIN "TABLE"."GRAPH_INDICES" "E" ON (("A"."ELEMENT_ID" = :SET_ID )
        AND ("A"."INDEXED_VALUE" = "E"."INDEXED_VALUE" ) )
    INNER JOIN ( SELECT
    "CANDIDATE",
    "N2"
        FROM ( SELECT
    "B"."ELEMENT_ID" AS "CANDIDATE",
    "C"."attributeInstanceCount" AS "N2",
    COUNT(*) AS "ESTIMATE"
            FROM "TABLE"."MINHASH_SIGNATURES" "A"
            INNER JOIN "TABLE"."MINHASH_SIGNATURES" "B" ON
((((("A"."INDEXED_VALUE" = "B"."INDEXED_VALUE" )
                AND ("A"."ELEMENT_ID" = :SET_ID )
)
                AND ("B"."ELEMENT_ID" < > :SET_ID ) )
                AND ("B"."ELEMENT_ID" >= :LOWER_BOUND ) )
                AND ("B"."ELEMENT_ID" <= :UPPER_BOUND ) )
            INNER JOIN "TABLE"."VERTICES" "C" ON (("B"."ELEMENT_ID" =
"C"."com.sap.ais.tax.core.uri" )
                AND ("C"."com.sap.ais.tax.core.type" = (domain) ) )
            GROUP BY "B"."ELEMENT_ID",
    "C"."attributeInstanceCount")
        WHERE (N2 <= 100)
        OR ((ESTIMATE-1) * N2 > 0.2 *:N1 * :K)
        OR ((ESTIMATE-1) * :N1 > 0.2 * N2 * :K)) as "D" ON ("E"."ELEMENT_ID"
= "D"."CANDIDATE")
    GROUP BY "D"."CANDIDATE",
    "D"."N2")
WHERE N12 > :THRESHOLD * :N1
OR N12 > :THRESHOLD * N2
```

Figure 3:
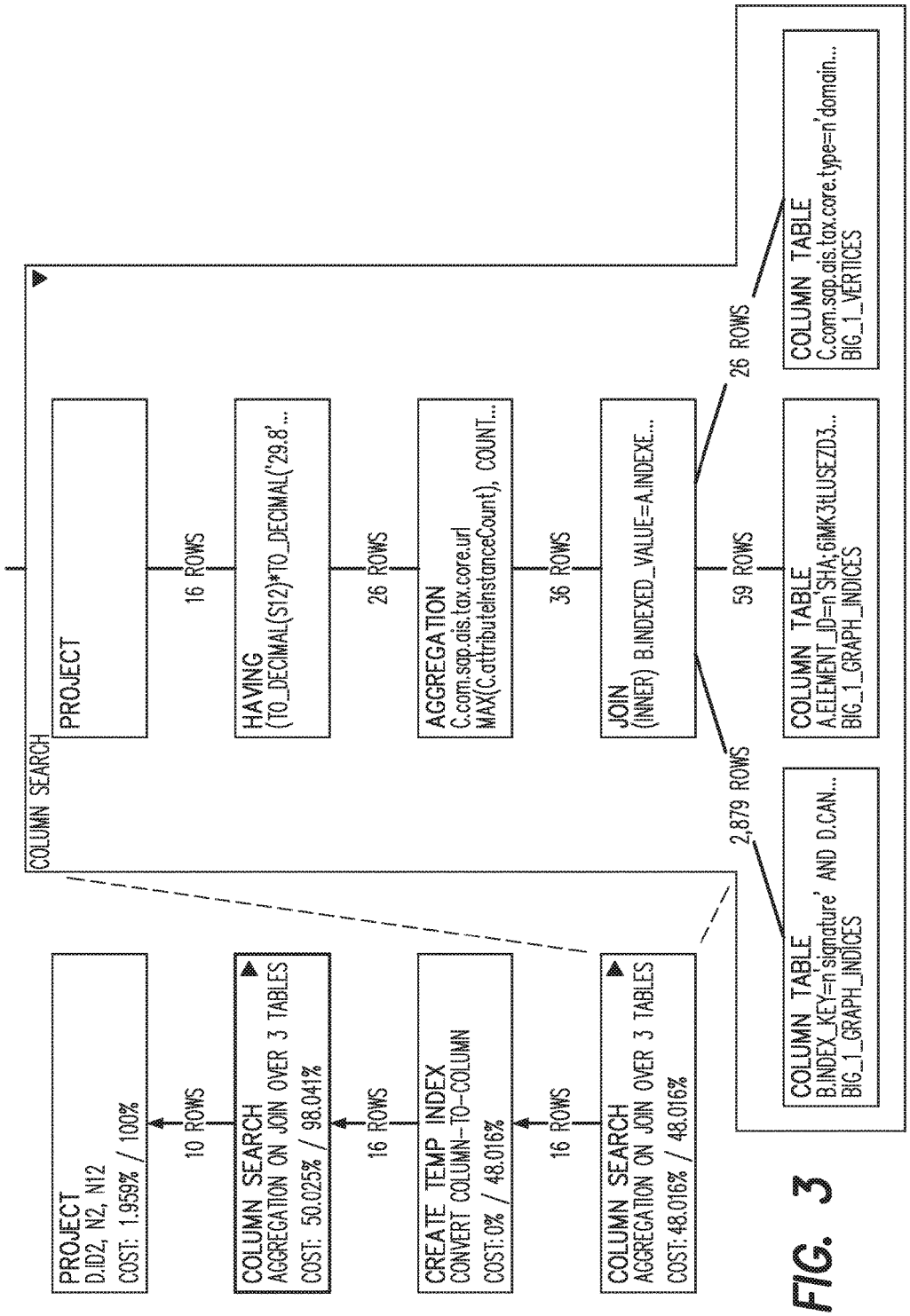
FIG. 3 illustrates an execution plan to prune candidate joins according to some embodiments.
Figure 4:
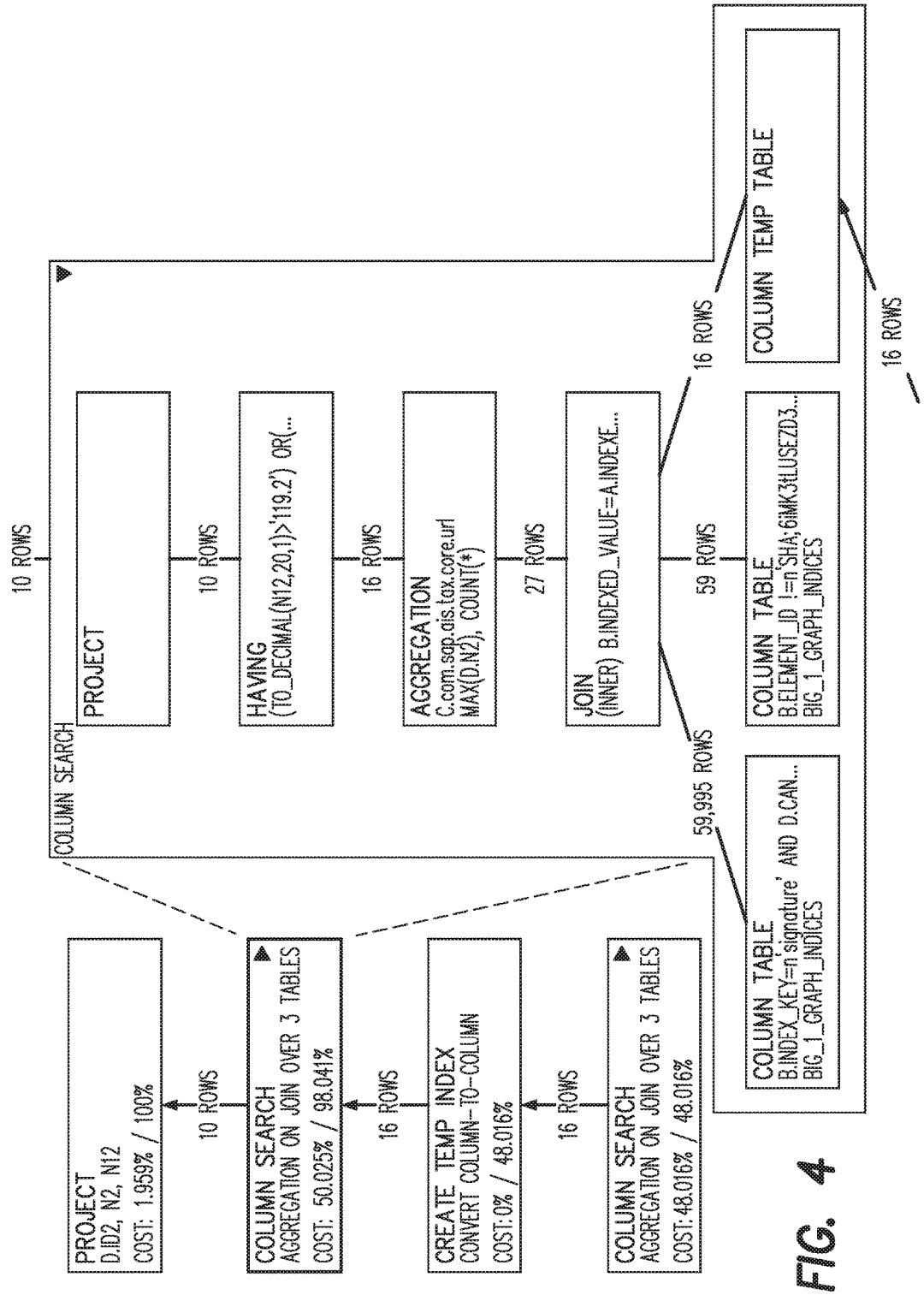
FIG. 4 illustrates an execution plan to determine intersections of a pruned list of candidate attributes according to some embodiments.

FIG. 3 illustrates the first stage of an execution plan corresponding to S260 according to some embodiments. In particular, FIG. 3 illustrates the identification of potentially similar attributes using the intersection ratio estimate $|h_k(A) \cap h_k(B)|/k$. Assuming a target 80% intersection ratio, attribute pairs are pruned for which the estimate is below a lower threshold (e.g., 20% in the SQL statement of FIG. 3). Next, as illustrated in FIG. 4 exact intersection sizes are computed at S270 for the subset of attributes which remain after the pruning at S260.

Figure 7:
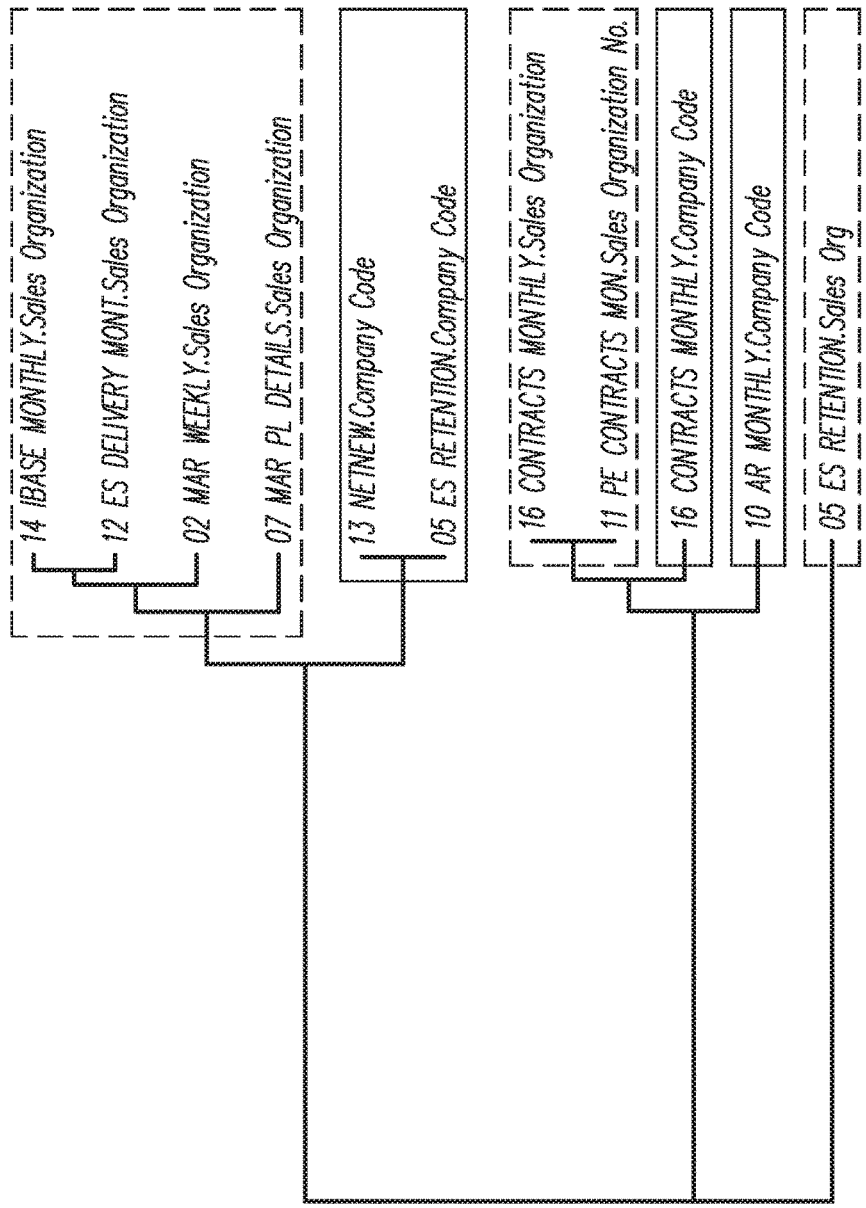
FIG. 7 illustrates attribute associations based on determined inclusions.

Finally, at S280, one or more of the remaining dataset attributes are associated with a semantic entity of a respective one of the stored attributes based on the determined intersections. For example, if it is determined that 99% of a dataset attribute domain is included in a domain of a stored attribute, the dataset attribute is associated with a semantic entity with which the stored attribute is associated. If two attributes from the same dataset are similar but have distinct domains, we assume that they relate to separate semantic entities. This assumption allows identification that "Company Code" variants and "Sales Organizations" variants from FIG. 7 are related to two distinct semantic entities, since datasets 05 and 16 contain both a Company Code and a Sales Organization. Absent this assumption, the domain comparison could indicate that two names exist for the same semantic entity.

Also, if an attribute A from a new dataset relates to two attributes B and C from a previous dataset, we compare the attribute names to assign A to the business entity whose source attribute has the most-similar name to attribute A.

In some embodiments, process 200 may be performed using data structures stored in the same database which hosts the newly-received datasets. Moreover, no data is required to be transferred or processed outside the database.

Figure 5:
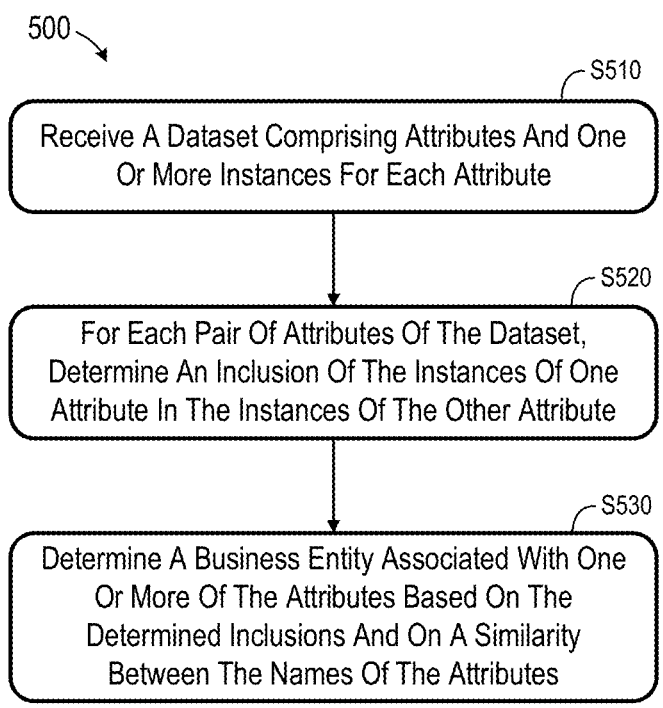
FIG. 5 comprises a flow diagram of a process according to some embodiments.

Process 500 of FIG. 5 may be performed to associate related attributes of a same dataset with different semantic entities (e.g., business classes). In this regard, a dataset is received at S510. The received dataset includes attributes and one or more instances for each attribute. As described above, an attribute may be a table column and its instances may be values stored in the table column. Each attribute (e.g., table column) is associated with a domain, which is a list of its unique instances (e.g., column values).

Figure 6:
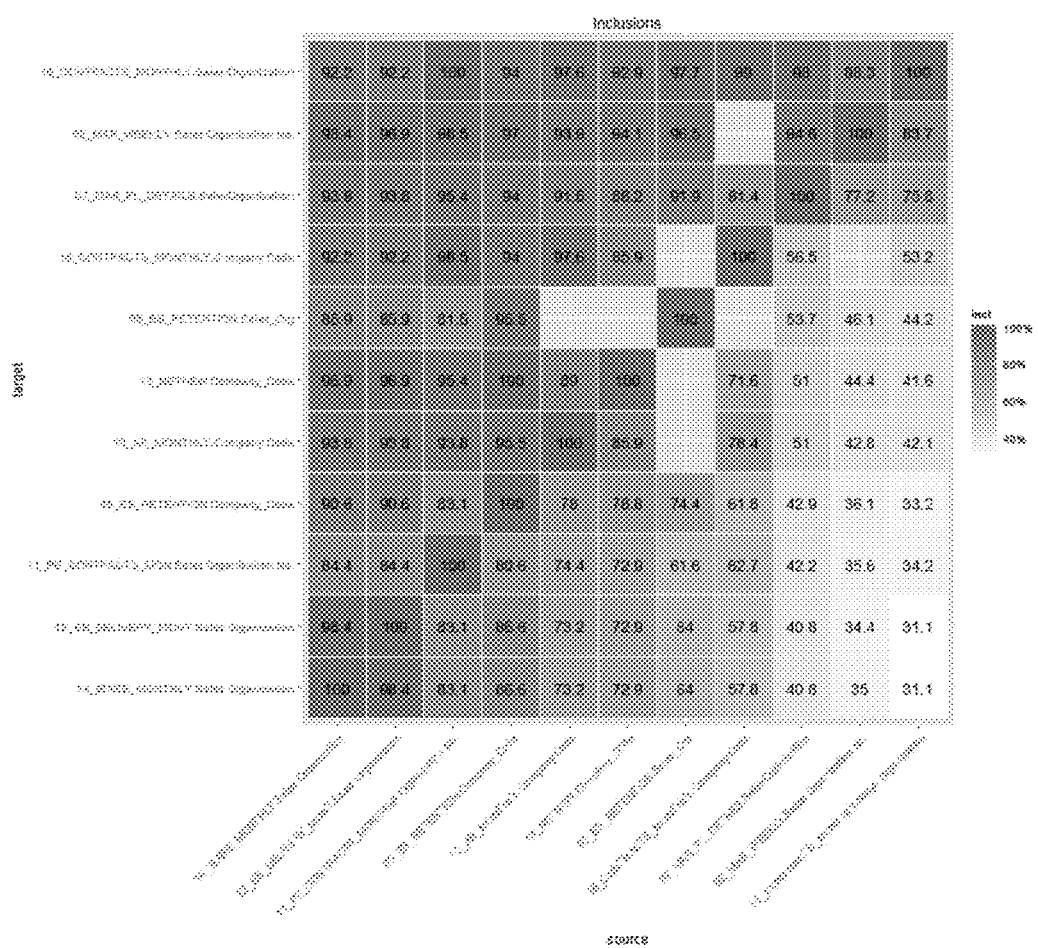
FIG. 6 illustrates inclusions determined for pairs of attributes of a dataset according to some embodiments.

At S520, and for each pair of attributes of the dataset, an inclusion of the instances of one attribute in the instances of the other attribute is determined. For example, given domain A and of a first attribute and domain B of a second attribute, S520 may comprise determining $|(A) \cap (B)|/|(A)|$ and $|(A) \cap (B)|/|(B)|$. FIG. 6 illustrates the results of S520 for a dataset including eleven attributes according to some embodiments. The results comprise two inclusion percentages for each pair of attributes, one percentage of inclusions of a first attribute domain in a second attribute domain, and one percentage of inclusions of the second attribute domain in the first attribute domain.

A business entity associated with one or more of the attributes is determined at S530. A business entity associated with one or more of the attributes may be determined based on the inclusions associated with the one or more of the attributes and on a similarity between the names of the attributes.

FIG. 7 illustrates a hierarchy of groupings of the attributes of FIG. 6 based solely on the determined inclusions shown in FIG. 6. Each hierarchy level corresponds to a degree of mutual inclusion between the attribute domains, with deeper levels corresponding to higher degrees of mutual inclusion. As shown, some attributes are hierarchically closer to attributes which have quite different names (and therefore likely different business semantics) than to attributes which have similar different names (and therefore likely similar business semantics). For example, groups of attributes having names related to sales organization are indicated by dashed lines and groups of attributes having names related to company code organization are indicated by solid lines.

Therefore, S530 includes determination of similarities between the names of the attributes are determined. According to some embodiments, the similarities are represented by a calculated "distance" between attribute names. The shorter the distance, the greater the similarity.

Any technique for determining a distance between attribute names which is or becomes known may be employed at S530 according to some embodiments, including a Levenshtein distance determination, a longest common substring determination, and a q-gram distance determination. Any techniques may be subject to pre-processing, such as ignoring case, separators and suffixes.

Figure 8:
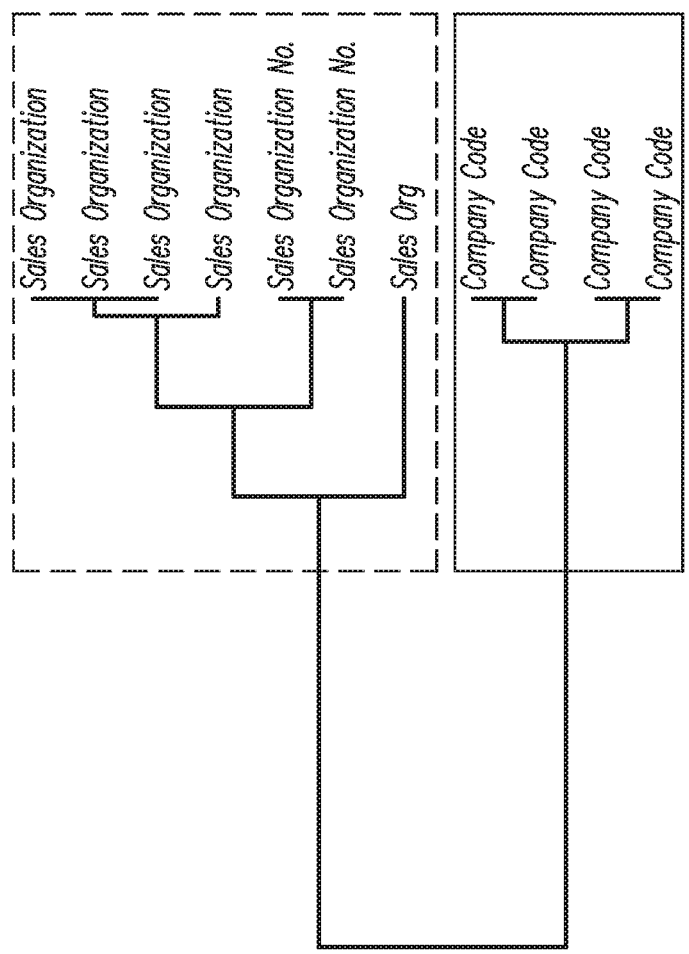
FIG. 8 illustrates attribute associations based on determined inclusions and attribute name distances according to some embodiments.

FIG. 8 illustrates the attributes of FIG. 7 in a hierarchy which is restructured to reflect inclusions and attribute names, in which the attributes surrounded by dashed lines in FIG. 7 are surrounded by a single dashed line in one side of the hierarchy, and the attributes surrounded by solid lines in FIG. 7 are surrounded by a single solid line on the other side of the hierarchy. Accordingly, at S530, the group of attributes surrounded by the dashed line may be associated with one business entity and the group of attributes surrounded by the solid line may be associated with another business entity.

Figure 9:
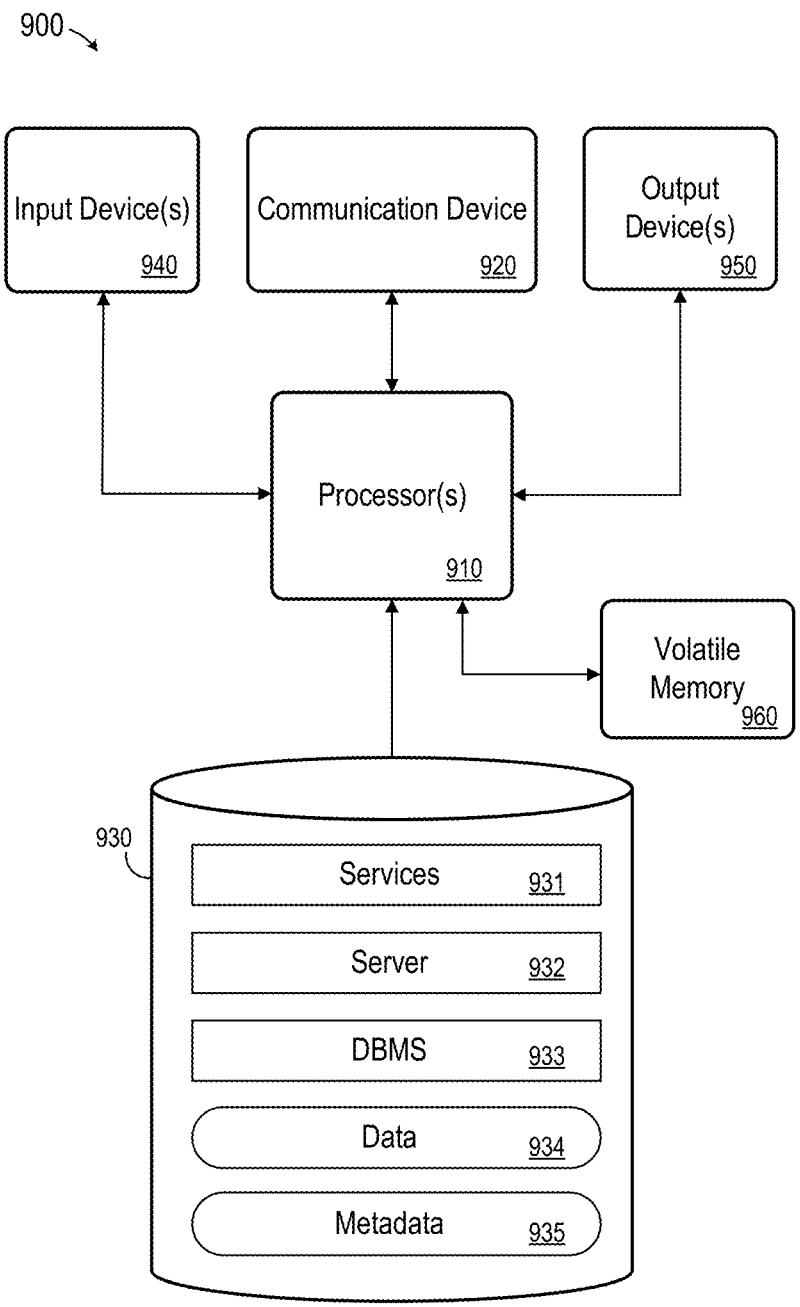
FIG. 9 is a block diagram of a system according to some embodiments.

FIG. 9 is a block diagram of system 900 according to some embodiments. System 900 may comprise a general-purpose computing apparatus and may execute program code to perform any of the functions described herein. System 900 may comprise an implementation of DBSM 120 and datastore 110 of FIG. 1. System 900 may include other unshown elements according to some embodiments.

System 900 includes processor(s) 910 operatively coupled to communication device 920, data storage device 930, one or more input devices 940, one or more output devices 950, and volatile memory 960. Communication device 920 may facilitate communication with a network, and thereby with data sources 150 and server 130. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into system 900. Output device(s) 950 may comprise, for example, a display (e.g., a display screen) a speaker, and/or a printer.

Volatile memory 960 may comprise Random Access Memory (RAM), Storage Class Memory (SCM) or any other fast-access memory. Data storage device 930 may comprise any storage device, including combinations of magnetic storage devices (e.g., magnetic tape, hard disk drives and flash memory), optical storage devices, Read Only Memory (ROM) devices, etc.

Services 931, server 932 and DBMS 933 and may comprise program code executed by processor(s) 910 to cause system 900 to perform any one or more of the processes described herein. For example, DBMS 933 may be executed to determine business entities associated with attributes of datasets which have been newly-received within data 934. Metadata 935 may be updated to reflect these associations. Embodiments are not limited to execution of these processes by a single apparatus. Data storage device 930 may also store data and other program code for providing additional functionality and/or which are necessary for operation of system 900, such as device drivers, operating system files, etc.

Data 934 (either cached or a full database) and metadata 935 may also be stored in memory 960. Data storage device 930 may also store data and other program code for providing additional functionality and/or which are necessary for operation of system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a storage device storing instances of a plurality of stored attributes;
   a memory storing processor-executable process steps; and
   a processor to execute the processor-executable process steps to cause the system to:
   receive a dataset comprising a dataset attribute and a set of instances of the dataset attribute;
   determine a similarity value between the set of instances of the received dataset attribute and respective sets of instances of the plurality of stored attributes to prune the plurality of stored attributes to a group of stored similar attributes having a similarity value above a predetermined similarity threshold but not being identical to the received dataset attribute;
   determine an intersection between the set of instances of the received dataset attribute and sets of instances of the pruned group of stored similar attributes; and
   in response to the received dataset attribute and a stored similar attribute having an intersection above a predetermined intersection threshold, generating and storing metadata in a database indicating a semantic entity of the received dataset attribute and a different semantic entity of the stored similar attribute are associated with each other.

2. A system according to claim 1, wherein the metadata provides notification to the database that a semantic business class of the received dataset attribute is further associated with the stored similar attribute.

3. A system according to claim 1, wherein the metadata provides notification to the database that a semantic business class of the stored similar attribute is further associated with the received dataset attribute.

4. A system according to claim 1, wherein the metadata indicates that a semantic business class of the received dataset attribute is associated with a different semantic business class of the stored similar attribute.

5. A system according to claim 1, wherein determination of the similarity value comprises:
   determination of $|h_k(A) \cap h_k(B)|/k$, where A and B are a pair of attributes, where $h_k(A)$ is the set of bottom k instances of attribute A ordered by hash key and where $h_k(B)$ is the set of bottom k instances of attribute B ordered by hash key.

6. A system according to claim 1, wherein the semantic entity of the received dataset attribute and the different semantic entity of the stored similar attribute each comprise different names of organizations within a business.

7. A system according to claim 1, wherein determination of the similarity value comprises execution of a structured query language statement.

8. The system according to claim 1, wherein the set of instances of the received dataset attribute and the sets of instances of the plurality of stored attributes each include a domain of instances consisting of unique instance values within a set of instances.

9. The system according to claim 1, wherein the metadata specifies a name of a business class and table attribute values of the business class.

10. A method comprising:
    receiving a dataset comprising a dataset attribute and a set of instances of the dataset attribute;
    determining a similarity value between the set of instances of the received dataset attribute and respective sets of instances of a plurality of stored attributes to prune the plurality of stored attributes to a group of stored similar attributes having a similarity value above a predetermined similarity threshold but not being identical to the received dataset attribute;
    determining an intersection between the set of instances of the received dataset attribute and one of sets of instances of the pruned group of stored similar attributes; and
    in response to the received dataset attribute and a stored similar attribute having an intersection above a predetermined intersection threshold, generating and storing metadata indicating a semantic entity of the received dataset attribute and a different semantic entity of the stored similar attribute are associated with each other.

11. A method according to claim 10, wherein the metadata indicates that a semantic business class of the received dataset attribute is associated with a different semantic business class of the stored similar attribute.

12. A method according to claim 10, wherein determination of the similarity value comprises execution of a structured query language statement.

13. A non-transitory computer-readable medium storing program code, the program code executable by a processor of a computing system to cause the computing system to:
    receive a dataset comprising a dataset attribute and a set of instances of the dataset attribute;
    determine a similarity value between the set of the received dataset attribute and respective sets of instances of the plurality of stored attributes to prune the plurality of stored attributes to a group of stored similar attributes having a similarity value above a predetermined similarity threshold but not being identical to the received dataset attribute;

determine an intersection between the set of instances of the received dataset attribute and sets of instances of the pruned group of stored similar attributes; and in response to the received dataset attribute and a stored similar attribute having an intersection above a predetermined intersection threshold, generate and store metadata indicating a semantic entity of the received dataset attribute and a different semantic entity of the stored similar attribute are associated with each other.

14. A medium according to claim 13, wherein the metadata provides notification to the database that a semantic business class of the received dataset attribute is further associated with the stored similar attribute.

15. A medium according to claim 13, wherein determination of the similarity value comprises:

determination of $|h_k(A) \cap h_k(B)|/k$, where A and B are a pair of attributes, where $h_k(A)$ is the set of bottom k instances of attribute A ordered by hash key and where $h_k(B)$ is the set of bottom k instances of attribute B ordered by hash key.

16. A medium according to claim 13, wherein the metadata indicates that a semantic business class of the received dataset attribute is associated with a different semantic business class of the stored similar attribute.

17. A medium according to claim 13, wherein determination of the similarity value comprises execution of a structured query language statement.

* * * * *